United States Patent
Hunter et al.

(10) Patent No.: US 7,903,337 B1
(45) Date of Patent: Mar. 8, 2011

(54) HIGH CONTRAST GRATING LIGHT VALVE

(75) Inventors: Jim Hunter, Campbell, CA (US); Chris Gudeman, Sunnyvale, CA (US); David T. Amm, Sunnyvale, CA (US); Akira Tomita, Sunnyvale, CA (US)

(73) Assignee: Silicon Light Machines, Sunnyvale, CA (US)

( * ) Notice: Subject to any disclaimer, the term of this patent is extended or adjusted under 35 U.S.C. 154(b) by 812 days.

(21) Appl. No.: 10/050,994

(22) Filed: Jan. 22, 2002

Related U.S. Application Data

(63) Continuation-in-part of application No. 10/029,875, filed on Dec. 31, 2001, which is a continuation-in-part of application No. 09/802,619, filed on Mar. 8, 2001.

(51) Int. Cl.
*G02B 5/18* (2006.01)

(52) U.S. Cl. .......................................... 359/573

(58) Field of Classification Search ............. 359/572, 359/573, 578, 224, 290–295
See application file for complete search history.

(56) References Cited

U.S. PATENT DOCUMENTS

| | | | |
|---|---|---|---|
| 5,311,360 A | 5/1994 | Bloom et al. | 359/572 |
| 5,808,797 A | 9/1998 | Bloom et al. | 359/572 |
| 5,841,579 A | 11/1998 | Bloom et al. | 359/572 |
| 6,169,624 B1 | 1/2001 | Godil et al. | 359/237 |
| 6,233,087 B1 * | 5/2001 | Hawkins et al. | 359/290 |

* cited by examiner

*Primary Examiner* — Alessandro Amari
(74) *Attorney, Agent, or Firm* — Steven B. Kelber; Berenato & White, LLC

(57) ABSTRACT

A grating light valve is provided with a plurality of spaced reflective ribbons, spatially arranged over a semiconductor substrate, the ribbons and substrate being provided with reflective surfaces. The grating light valve is configured to optimize the conditions for constructive and destructive interference with an incident light source having a given wavelength. In a preferred embodiment, one set of ribbons is moveable with respect to the substrate and the second set of ribbons. The substrate is typically provided with a protective layer, which may be thermally grown silicon dioxide or other dielectric. A conductive trace is provided on the dielectric layer and grounded through the dielectric layer to the substrate, comprising a conductive trace for easy release of charge otherwise trapped on or at the dielectric layer.

9 Claims, 5 Drawing Sheets

HIGH CONTRAST GRATING LIGHT VALVE

This application is a continuation-in-part of U.S. patent application Ser. No. 10/029,875, filed Dec. 31, 2001, which in turn is a continuation-in-part of U.S. patent application Ser. No. 09/802,619, which was filed on Mar. 8, 2001. The entirety of those applications are incorporated herein by reference.

BACKGROUND OF THE INVENTION

1. Field of the Invention

The invention relates to grating light valve devices. More particularly, the present invention relates to grating light valve devices with an asymmetric configuration of movable ribbons for optimizing diffraction conditions which may be provided with a conductive trace to permit discharge or escape of electrical charges that may build up on the surface of a dielectric layer, and otherwise be trapped there, in the absence of the conductive layer.

2. Background of the Technology

Recent developments in the miniaturization of various electro-mechanical devices, also known as micro machines, has led to the emergence of miniature diffraction gratings. One type of miniature diffraction grating is a grating light valve. A grating light valve is a device that is capable of alternating between the conditions for constructive and destructive interference with an incident light source λ to modulate the reflected light source between a minimum and maximum intensity value, preferably in a stepwise fashion. Grating light valves have applications in display, print, optical and electrical device technologies. Examples of a grating light valves and their uses are disclosed in the U.S. Pat. No. 5,311,360 issued to Bloom et al., which is hereby incorporated by reference.

Referring to FIG. 1a, the grating light valve (GLV) construction as taught in U.S. Pat. No. 5,311,360, has a plurality of movable ribbons 100 that are spatially arranged over a substrate 102. The surfaces 104, corresponding to the ribbon tops and the regions of the substrate between the ribbons, are reflective. The surfaces 104 are made to be reflective by depositing a thin film of reflective materials, such as silver or aluminum on the substrate 102 and the ribbons 100. The ribbons and the substrate structure are micro fabricated from silicon-based materials. The height difference 103 between the reflective surfaces 104 of the substrate 102 and the reflective surfaces 104 of the ribbons 100 are configured to be λ/2 when the ribbons 100 are in the up position as shown in FIG. 1a. When light having a wavelength λ impinges on the compliment of reflective surfaces 104, light that is reflected from the surfaces 104 of the substrate 102 and ribbons 100 will be in phase. Light which strikes the reflective surfaces 104 of the substrate 102 travels λ/2 further than the light striking the reflective surfaces 104 of the ribbons 100. Then the portion of light that is reflected back from the reflective surfaces 104 of the substrate 102 returns traveling an addition λ/2 for a total of one complete wavelength λ. Therefore, the compliment of the reflective surfaces 104 function as a mirror to the incident light source with a wavelength λ.

By applying an appropriate bias voltages across the ribbons 100 and the substrate 102, a portion of the ribbons 100 move towards and contact the substrate 102, as shown in FIG. 1b. The thickness $T_r$ of the ribbons 100 is designed to be λ/4 such that the distance 103' is also λ/4. When light having a wavelength λ impinges on surfaces 104 and 104' with the ribbons 100 in the down position, as shown in FIG. 1b, the portion of light reflected from the surfaces 104' of the ribbons 100 will be out of phase with the portion of light reflected from the surfaces 104 of the substrate 102, thereby generating the conditions for destructive interference. By alternating the ribbons between the positions for constructive interference, as shown in FIG. 1a, and the positions for destructive interference, as shown in FIG. 1b, the grating light valve is capable of modulating the intensity of reflected light from an impinging light source having a wavelength λ.

In practice, the device is made by taking advantage of selective etching of a sacrificial polysilicon layers, which is blocked by a dielectric layer underneath. Charge or potential can rapidly build up on the surface of the dielectric layer. While larger, conventional IC's may be insensitive to such "trapped charges," on the surface of the dielectric, even a very small charge potential may negatively impact the performance of a zero order GLV.

SUMMARY OF THE INVENTION

There have been several advances in grating light valve devices both in the fabrication processes and in design. For example, flat diffraction grating light valves and their advantages are described in U.S. Pat. No. 5,841,579 and U.S. Pat. No. 5,808,797, both issued to Bloom et al., the contents of which are incorporated by reference. FIGS. 2a-b illustrate cross sectional views of a flat diffraction grating light valve and its operation. Flat diffraction grating light valves, have at least two sets of alternating ribbons 206 and 207 that are approximately in the same reflective plane.

Referring to FIG. 2a, the ribbons 206 and 207 are suspended over a substrates structure 202 by a distance 205. The ribbons 206 and 207 are provided with a reflective surfaces 204 and 205, respectively. Preferably, the surface of the substrate 202, or a portion thereof, also has a reflective surface 208. The reflective surfaces of the substrate 208 and the reflective surfaces of the ribbons 204 and 205 are preferably configured to be separated by a distance approximately equal to a multiple of λ/2 of the impinging light source. Thus, the portion of light that is reflected from the compliment of surfaces 204, 205 and 208 are all phase, constructively interfere and the maximum intensity is observed. In operation, the flat diffraction grating length valve alternates between the conditions for constructive and destructive interference by moving the first set of ribbons 206 or the second set of ribbons 207 relative to reach other by a distance corresponding to λ/4.

In one mode of operation, light is modulated by moving one set of alternating ribbons relative to a stationary set of alternating ribbons. The ribbons that are moved are referred to as the active ribbons and the stationary ribbons are referred to as the bias ribbons. The active ribbons are moved by any number of means including mechanical means, but are preferably moved by applying a sufficient bias voltage across the active ribbon and the substrate to create an electronstatic attraction.

Now referring to FIG. 2b, when a sufficient bias voltage is applied across the active of ribbons 207 and the substrate 202, the ribbons 207 are displaced relative to the bias ribbons 206 by a distance 203 that is approximately equal to a multiple of λ/4. Accordingly, the portions of light that are reflected from the surfaces 205' of the active ribbons 207 will destructively interfere with the portion of light that are reflected of the surfaces 204 of the bias ribbons 206. It will be clear to one skilled in the art that a grating light valve may be configured to modulated an incident light source with a wavelength λ in other operative modes. For example, both sets of ribbons 206 and 207 may be configured to move and separate by multiples of λ/4 in order to alternate between the conditions for constructive and destructive interference.

While current designs of grating light valves have improved their operating efficiency and reliability, there is continued need to further optimized of grating light valve devices for use in display, print, optical and electrical device technologies.

In accordance with the instant invention a grating light valve has a diffraction cross section that is capable of interfering constructively and destructively with an incident light source having a wavelength $\lambda$. The grating light valve of the instant invention is configured to operate with any number of light sources, but is most useful for diffracting incident light sources with wavelengths between 300 and 3000 nanometers. The grating light valve preferably has a plurality of movable ribbons each coated with a reflective layer.

The plurality of moveable ribbons are comprised of at least two of sets of alternating ribbons. The ribbon in the first set have average widths $W_a$ that are preferably 1 to 6 microns in the diffraction region of the device. The ribbons in the second set have average widths $W_b$ that are preferably 0.5 to 5 microns in that diffraction region of the device. The ribbons of the first set and the ribbons of the second set are uniformly separated by an average width $W_s$ of 0.5 to 2.0 microns in the diffraction region of the device.

The ribbons are suspended over reflective regions of a substrate element. The reflective regions of the substrate correspond to the spaces $W_s$ between the alternating ribbons. In the constructive interference position the reflective surface of the ribbons are preferably in the same reflective plane and separated from the reflective regions of the substrate by a distance approximately equal to a multiple of $\lambda/2$ such that the compliment of reflective surface including the reflective regions of the substrate act as a mirror.

The diffraction efficiency and the contrast of the grating light device is improved by configuring the device to generate amplitudes of reflected light from the first set of ribbons that is substantially equal to the sum of the amplitudes of the reflected light from the second set of ribbons and the reflective light from the reflective regions of the substrate. Preferably, the amplitude matching is accomplished by making $W_a$ equal to the sum of a width $W_b$ and $W_s$ within the diffraction region of the grating light valve and by providing the ribbons and the reflective regions of the substrate between the ribbons with the same reflective surfaces. Accordingly, in the destructive interference position, the compliment of reflective surfaces maximize cancellation of the reflected light and, hence, maximize the contrast of the grating light valve.

In operation, the first set of ribbons is moved by a distance equal to a multiple of $\lambda/4$ in order to switch between the conditions for constructive and destructive interference. Preferably, the first set of ribbons is moved towards the reference surfaced of the substrate by applying a sufficient bias voltage across the first set of ribbons and the substrate element. Alternatively, both the first set and the second set of ribbons are moved in opposite directions relative to the reference surface of the substrate to switch between the conditions for constructive and destructive interference.

Where charge trapping in a dielectric layer of the substrate needs to be avoided, a conductive trace is provided over and through the dielectric to dissipate the charge.

DETAILED DESCRIPTION OF THE INVENTION

Flat diffraction grating light valves, described above, which have at least two sets of movable ribbons are preferably over a single set of movable ribbons, for performance and manufacturing reasons that are detailed in U.S. Pat. No. 5,841,579. While the flat diffraction grating light valve is preferred, there are still several short comings that must be overcome to optimize the contrast and efficiency of the device.

One inefficiency is a flat grating light valve arises because of the spaces between the alternating active and bias ribbons. The spaces between the alternating active and bias ribbons are required because of manufacturing tolerances and for operation tolerances that allow the active ribbons to move relative to the bias ribbons. As a result, a considerable portion of the incident light passes between the ribbons and impinges the regions of the substrate corresponding to the spaces. If these regions of the substrate surface are not properly constructed to reflect the incident light source or are not properly phase matched with the active and the bias ribbons, then the maximum efficiency of the device is not achieved and the maximum contrast will not be observed.

In other words, to optimize the contrast and efficiency of a light grating valve, light that is reflected from interference surfaces within the diffraction region of a grating light valve must be completely in phase for constructive interference and completely out of phase for destructive interference. Further, the interfering light reflected from the surfaces that are interfering must have the same amplitude to achieve total cancellation of the light.

Thus, to improve the efficiency of the light grating device and to optimize the contrast of the modulated light, the instant invention provides for reflective surfaces on the substrate in the regions corresponding to the spaces between the alternating ribbons which are matched to the bias and active ribbons. Preferably this is accomplished by providing reflective surfaces on the ribbons and on the regions of the substrate between the ribbons which have the same reflectivity. This goal is further accomplished by providing an asymmetric ribbon configuration such that the reflective surface area of interfering surfaces are match.

Figure 1A:
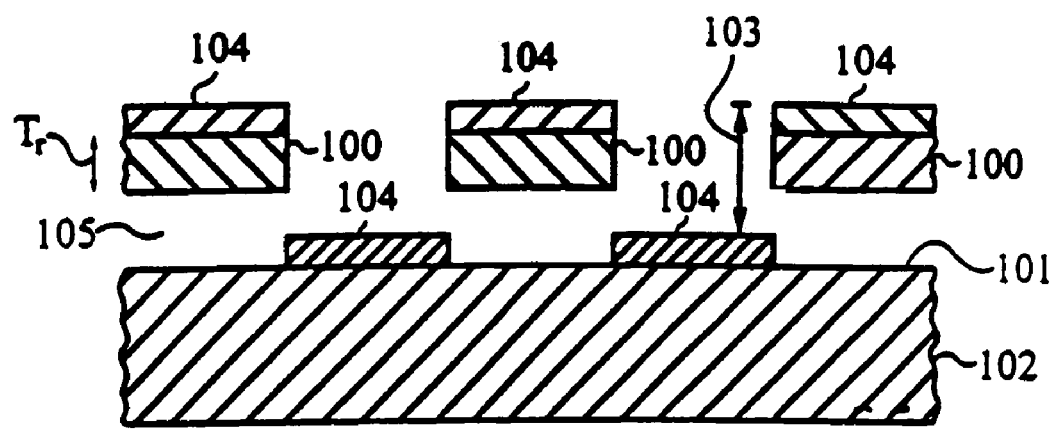
FIG. 1a-b are cross sectional representations of a grating light valve with a reflective ribbons that are movable relative to the reflective surfaces of a substrate to alternate between the conditions for constructively and destructively interfere with an incident light source having a wavelength $\lambda$.
Figure 1B:
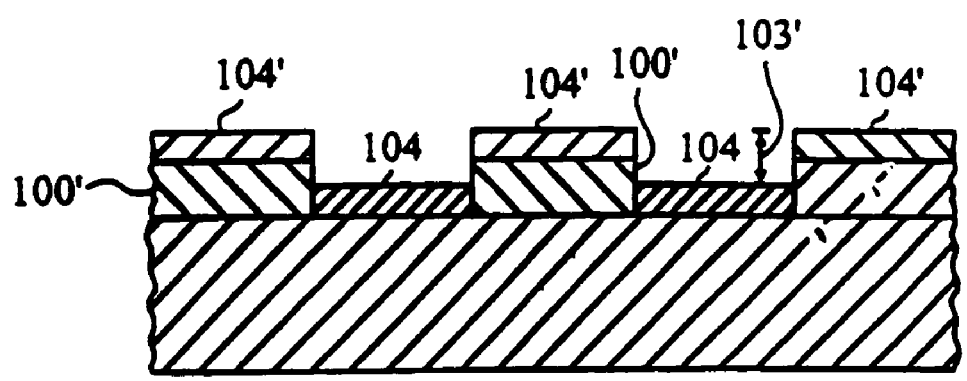
Figure 2A:
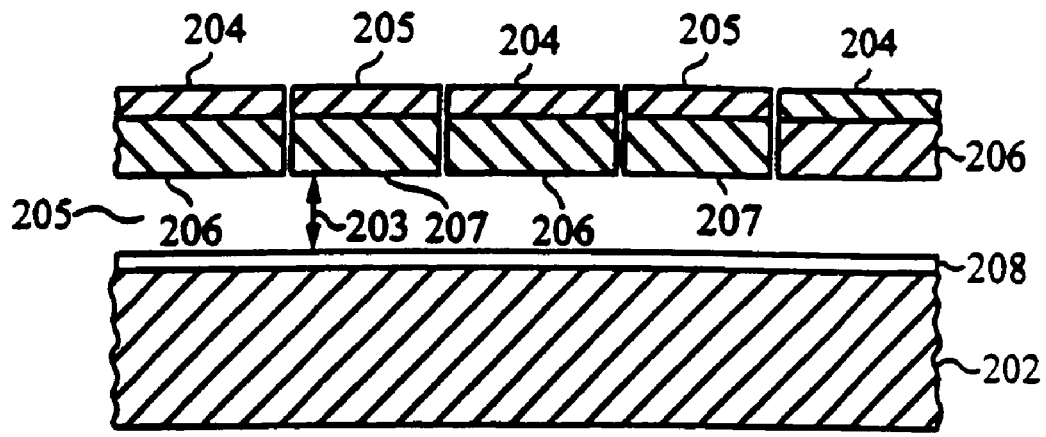
FIG. 2a-b are cross sectional representations of a flat diffraction grating light valve with two sets of alternating reflective ribbons that are movable relative to each other to alternate between the conditions for constructively and destructively interfering with an incident light source having a wavelength $\lambda$.
Figure 2B:
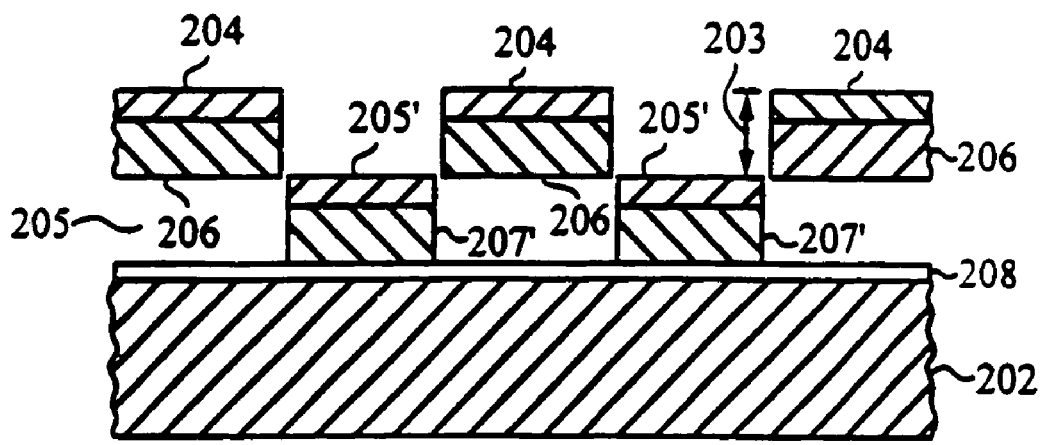
Figure 3:
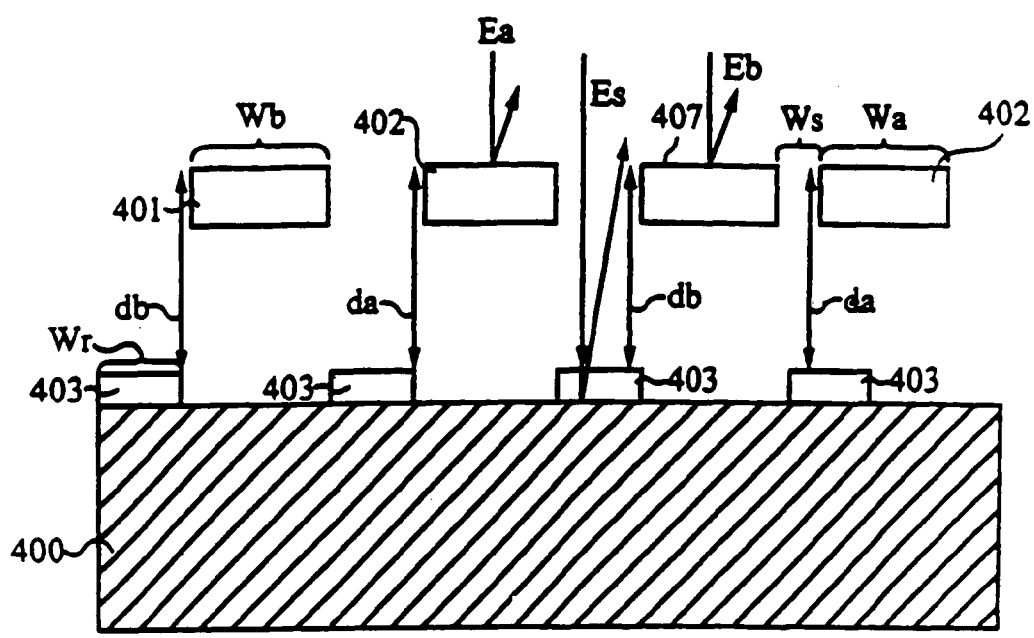
FIG. 3 is a cross sectional representation of a grating light valve with reflective active ribbons and alternating reflective bias ribbons spatially arranged over a substrate with reflective regions between the ribbons.

FIG. 3 shows a simplified cross sectional representation of a flat grating light valve. The grating light valve has a set of bias ribbons 401 and a set of active ribbons 402. The device is configured to constructively and destructively interfere with an incident light source (now shown) having a wavelength $\lambda$. In order to maximize light $E_a$ and $E_b$ that are reflected from the top surface of the ribbons 401 and 402, the ribbons 401 and 402 preferably form a single reflective plane. Further, to maximize the light $E_S$ that is reflected from regions 403 of the substrate, the distances $d_a$ and $d_b$ are preferably a multiple of $\lambda/2$.

According to the previous flat grating light valve designs, the widths $W_b$ of the bias ribbons 401 and the widths $W_a$ of the active ribbons are approximately the same, within manufacturing tolerances of ±10%. In operation, the active ribbons 402 are moved toward the substrates 400 by a distance that is equal to a multiple of $\lambda/2$ such that the portions of the incident light $E_b$ that are reflected from the bias ribbons 401 and the portions of the incident light $E_a$ that are reflected from the active ribbons 402 are out of phase 403 and destructively interfere. In this case, even if $E_b$ and $E_a$ completely cancel the total light that is reflected, it will still include a contribution from $E_s$ and therefore, the contrast is not optimized.

In order to optimize the condition for destructive interference and, therefore, optimize the contrast of the grating light valve, the grating light valve of the instant invention utilizes ribbons that exhibit asymmetric reflection amplitudes. Preferably, the ribbons are configured such that the amplitude of the incident light that is reflected by the set of active ribbons is substantially matched to the amplitude of incident light that is reflected by the sum of the set of bias ribbons and reflective regions of the substrate. Preferably, all the reflective surfaces have approximately the same reflectivity and the active ribbons have reflective surface areas that are approximately equal to the sum of the reflective surface areas of the bias ribbons and the reflective regions of the substrate.

The ribbons are preferably elongated and rectangular-like in shape. Further, the ribbons are preferably uniformly spaced. Accordingly, the asymmetric reflectivity of the ribbons is preferably achieved by making the average width $W_a$ each of the active ribbons greater than the average width $W_b$ each of the bias ribbons such that the sum of $W_b$ and the spaces $W_s$ between each of the alternating active and bias ribbons is approximately equal to $W_a$. Most preferably, the widths of the active ribbons $W_a$ are made to be 1 unit wider than the widths $W_b$ of the bias ribbons and, therefore, the widths $W_s$ of the spaces between the alternating active and bias ribbons is approximately equal to 1 unit.

Figure 4:
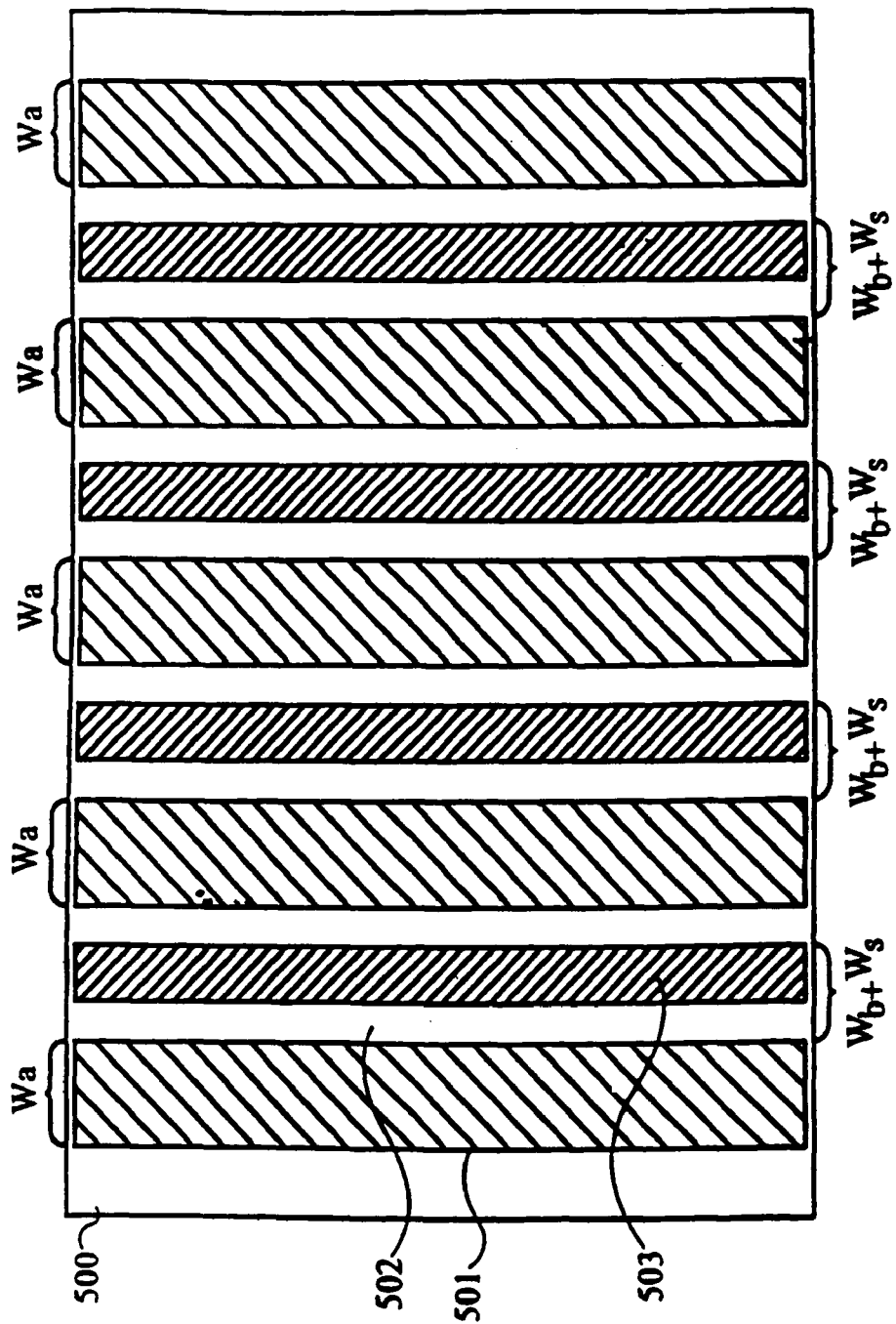
FIG. 4 illustrates a top schematic view of a grating light valve with asymmetric ribbons in accordance with the instant invention.

FIG. 4 shows a schematic representation of a grating light valve configured with sets of asymmetric ribbons 501 and 503, in accordance with the instant invention. The asymmetric ribbons are uniformly spaced by a distance $W_s$ and the average widths $W_a$ of the active ribbons 501 are approximately equal to the width $W_b$ of the bias ribbons and the spacings $W_s$. The ribbons 501 and 503 are co-planar in the absence of and applied voltage. To place the ribbons in the condition for destructive interference with an incident light source having a wavelength $\lambda$, the active ribbons 501 are displaced towards the substrate 500 by a distance approximately equal to a multiple of $\lambda/4$.

Figure 5:
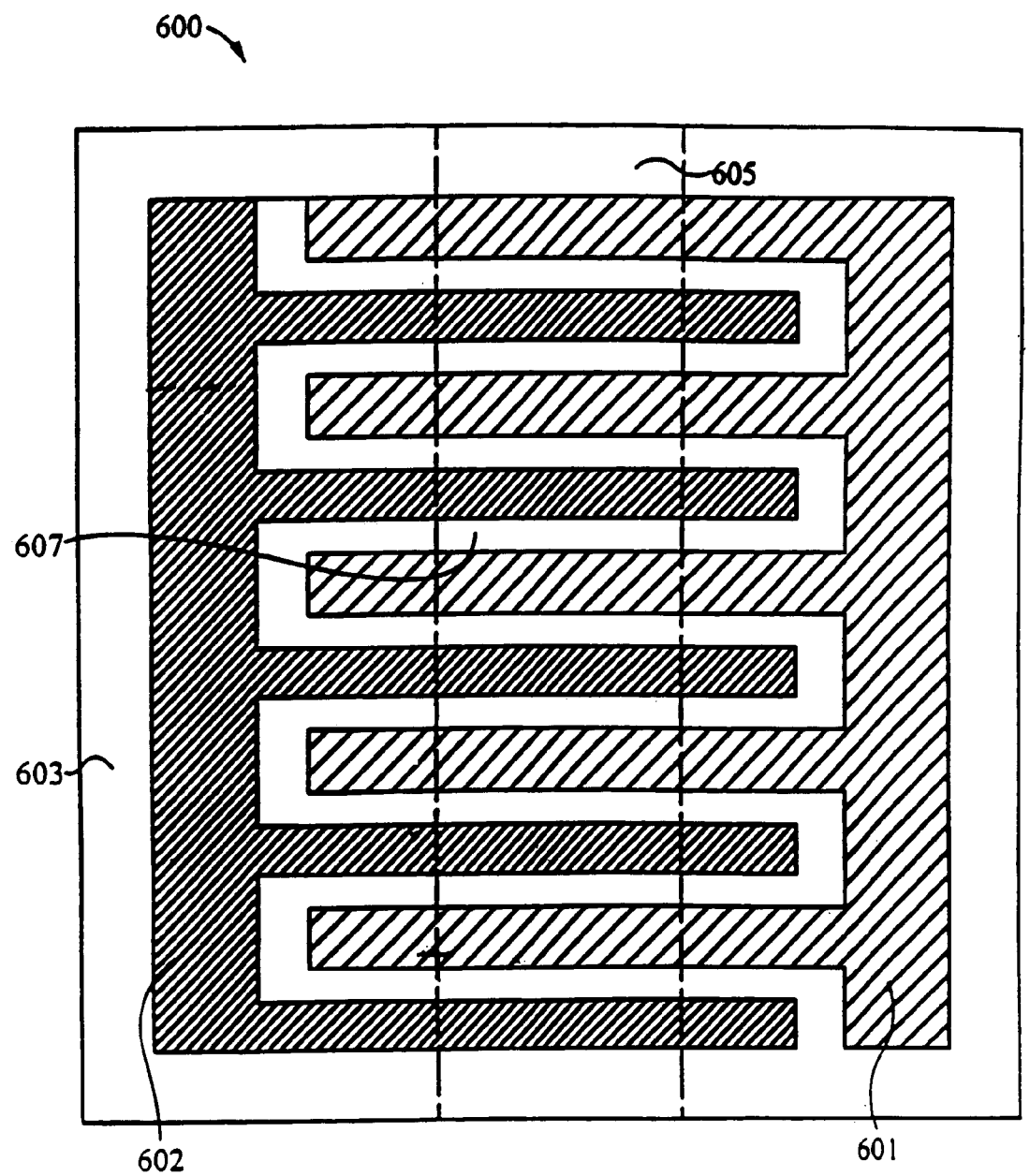
FIG. 5 illustrates a grating light valve with reflective elements attached to a substrate with each of the reflective elements having spaced ribbons for generating the conditions for constructive and destructive interference with an incident light source having a wavelength $\lambda$.

FIG. 5 shows a schematic representation of a grating light valve 600 in accordance with the instant invention. The grating light value 600 has at least two reflective elements 601 and 602 that are attached to a substrate element 603. Each of the reflective elements 601 and 602 has a plurality of ribbons which are suspended over the substrate surface 603 and are capable of being moved relative to each other to constructively and destructively interfere with light source having a wavelength $\lambda$ which is incident on the diffraction region 605 of the device 600. Preferably the regions of the substrate 607 between the ribbons and in the diffraction region 605 are also reflective. The total reflective surface area of the reflective element 601 is approximately equal to the total reflective surface area of the reflective element 602 and the reflective surface area of the substrate region 607 corresponding to the diffraction region 605 of the device 600.

In operation, the ribbon of the reflective elements 601 and 602 are substantial co-planar and suspended above the reflective regions 607 of the substrate 603 by a distance equal to a multiple of $\lambda/2$ to achieve the condition for constructive interference and maximum brightness. To achieve the condition for destructive interference, the ribbons of the reflective element 601 are moved toward the substrate by a distance that is equal to $\lambda/4$, as described in detail above.

As noted above, in operation, due to the use of a preferential etchant using sacrificial polysilicon as the sacrificial layer with a "stop" or protective layer of a dielectric such as silicon dioxide, the resulting GLV comprises a structure with a substrate, typically of silicon although any conventional substrate including GaAs may be used, with an overlying layer of a dielectric, typically thermally grown. The operation of the device may naturally lead to the accumulation of trapped charge, or potential, on the surface of the dielectric. While the presence of a limited amount of trapped charge in the dielectric layer or layers of a conventional IC may pose little problem to the continued faithful operation of the IC, even very small potentials may negatively impact the performance of the GLV's of this invention. Accordingly, a need to provide a method for discharging the potential isolated on the surface of the dielectric and therefor rendered immobile or "trapped" potential is required.

U.S. Pat. No. 6,169,624 which is not prior art with respect to this application, refers to a phenomenon that although may be incorrectly described, may be related. The '624 patent suggests that in operation, charge becomes trapped IN the dielectric layer. To the extent the surface of the dielectric is where the charge is trapped, this reference is discussing the same phenomena addressed herein. The patent further refers to normal operation as injecting electric charge (ions) INTO the dielectric layer. Although this sort of injection is well known, it is unlikely to occur at the very low potentials employed in GLV of this type. Accordingly, to the extent the '624 patent addresses the presence of charge "trapped in the dielectric" by referring to charges on the surface of the dielectric, it attempts to achieve this goal by providing a conductive trace formed on the dielectric layer. The conductive trace allows the trapped charges on the dielectric layer to escape. The full disclosure of U.S. Pat. No. 6,169,624 is incorporated herein by reference. To the extent the term "trapped in the dielectric layer" is used in this application, it is intended to refer to charges that are immobile, and therefor trapped, on the dielectric through operation of the device, generally regarded as a surface phenomenon.

In the '624 patent, a conductive trace is provided by taking advantage of the "cutouts" in the interdigitated ribbon designed to metallize a serpentine pathway on the dielectric. While a similar alternative may be used in conjunction with the claimed invention, in a preferred embodiment a conductive trace is provided on the dielectric but also through the dielectric, to be grounded to the substrate, considered the bottom electrode. Again, although any standard semiconductor wafer can be used as the starting material, the classic semiconductor wafer or substrate is a silicon semiconductor. A protective layer is grown or otherwise deposited on the substrate, to protect the substrate from etching during the release process. Conventional oxides include silicon dioxide, which can be easily thermally grown on the silicon substrate, typically to a depth of 250 to 500 Å. Silicon dioxide is a preferred dielectric as it is resistant to $XeF_2$ etching, a preferred etchant for the sacrificial polysilicon which is deposited on top of the dielectric.

Polysilicon is deposited using conventional processing. Typically, the thickness of this sacrificial layer will be targeted to equal either ¼ or ½ of the wavelength of the incident light for the desired application of the GLV in question. The selection of either ¼ or ½ the wavelength of the incident light will be dependent on the desired mode of operation of the GLV (to collect zero order or first order light) thicknesses of the sacrificial layer will vary, typically between about 6,500-10,000 Å, with a range of 8,500-8,700 Å, a preferred range.

After deposition of the sacrificial polysilicon layer, a first masking step is performed. The mask has two purposes. Regions of the polysilicon are removed to allow access to the substrate, and anchor structures for the ribbon (typically nitride) to be formed are provided, to anchor the ribbons to the silicon substrate. Typical etchants employ a $Cl_2$ based plasma etch which etches the silicon very well, but does not etch the initial protective layer, typically silicon dioxide.

The first photo mask is stripped and the structure cleaned and thereafter the ribbon material is deposited. Again, a wide variety of nitrides can be selected, known to those of skill in the art, but SiN is a preferred ribbon material. While the thickness of the deposited nitride can be tuned to set a desired operation voltage, a preferred thickness is about 1,000 Å of LPCVD SiN with ranges of 500-2,000 Å typically employed.

Subsequent to deposition of the ribbon material, a second masking step is employed to identify or outline the ribbons. Once the ribbon structures are defined, a second plasma etch is used to etch the SiN and etch into the Si sacrificial layer. This step both defines the ribbons and exposes the sacrificial layer so that it may be later removed by isotropic $XeF_2$ etching.

Following ribbon definition, the structure is metallized. The preferred metal for this process is aluminum, which is deposited on the wafer for interconnect formation. The layer is then patterned and etched, using an etchant that is selective to the underlying ribbon material.

The wafer is then subjected to a "partial" release. This is done using highly selective, isotropic $XeF_2$ etching chemistry. The end goal of the partial release is to clear the gaps between the ribbons and undercut the ribbons, simultaneously leaving a connecting spine under the ribbons so that they will remain mechanically stable during subsequent processing.

After the partial release using isotropic etching is completed, contact holes are provided which allow the conductive serpentine trace on the etch to be grounded to the substrate. The pattern is etched in a plasma chemistry suitable for etching oxide with reasonable selectivity to Si. A wide variety of etchants known to those of skill in the art may be used, depending on the oxide originally selected to protect the substrate during the $XeF_2$ release step.

As noted above, the final substrate has two sets of interleaved ribbons, having different widths, with spaces between. To finalize the ribbons and provide a reflective layer in the gaps between as well as on the ribbons themselves, a thin aluminum layer is deposited onto the structured wafer. This completes the reflective surface of the ribbons, the resulting serpentine path in the ribbon gap regions forming a low resistance pathway which is grounded to the substrate for discharge of electric charge otherwise trapped in or on the protective dielectric layer. The contacts are sintered to provide for good electrical connection.

A second, final and complete release using selective etching is practiced, freeing the ribbons so that they are able to be deflected electrostatically, providing an effective optical modulator. In this process, the evaporated Al layer protects the contact holes from being damaged by the $XeF_2$ release.

The invention of this application has been described generically and with respect to specific embodiments. Alternatives will occur to those of ordinary skill in the art, particularly in terms of the selection of materials, process conditions, and subject structures. These alternatives remain within the scope of the invention, unless excluded by the resuscitation of the claims set forth below.

What is claimed is:

1. A reflective light processing element, comprising:
   a substrate;
   a dielectric layer formed on the substrate;
   a conductive trace fanned on the dielectric layer, the conductive trace allowing charges trapped at the dielectric layer to escape wherein said trapped changes are present at least on the surface of the dielectric layer; and
   a plurality of ribbons formed above the substrate and the conductive trace.

2. The reflective light processing element of claim 1, where said trapped charges are formed, with respect to the dielectric layer, during operation of said reflective light processing element.

3. The grating light valve of claim 1, wherein said dielectric layer comprises silicon dioxide.

4. The grating light valve of claim 1, wherein said conductive trace is comprised of aluminum.

5. The grating light valve of claim 1, wherein width SWa is $\leq W_b$.

6. The grating light valve of claim 1, wherein the top surfaces of the ribbons in said first set and the top surfaces of the ribbons in said second set and regions of the surface between the ribbons of the first set and second set have reflective surfaces.

7. The grating light valve of claim 6, wherein the reflective surfaces comprise aluminum.

8. A reflective light processing element, comprising:
   a substrate;
   a dielectric layer formed on the substrate;
   a conductive trace formed on the dielectric layer, the conductive trace allowing charges trapped in the dielectric layer to escape; and
   a plurality of ribbons formed above the substrate and the conductive trace, wherein each of said ribbons comprise atop surface that is reflective and said reflective surfaces exhibit the same degree of reflectively.

9. A high contrast grating light valve comprising a silicon substrate;
   a protective dielectric layer formed on the substrate;
   a first set of ribbons each with a first average width $W_a$ and a second set of ribbons each with a second average width $W_b$, wherein the ribbons of the first set alternate between the ribbons of the second set and, one of said first and second set of ribbons is configured to move relative to the other to constructively and destructively interfere with an incident light source having a wavelength X;
   wherein said substrate comprises a silicon wafer protected by a dielectric layer and a conductive trace formed at least partly on the protective layer and in electrical contact with said substrate, allowing charges trapped on the protective layer to escape, wherein each of said first and second set of ribbons comprises a top surface which is reflective, and said reflective surfaces exhibit the same degree of reflectivity.

* * * * *